Figure 1:
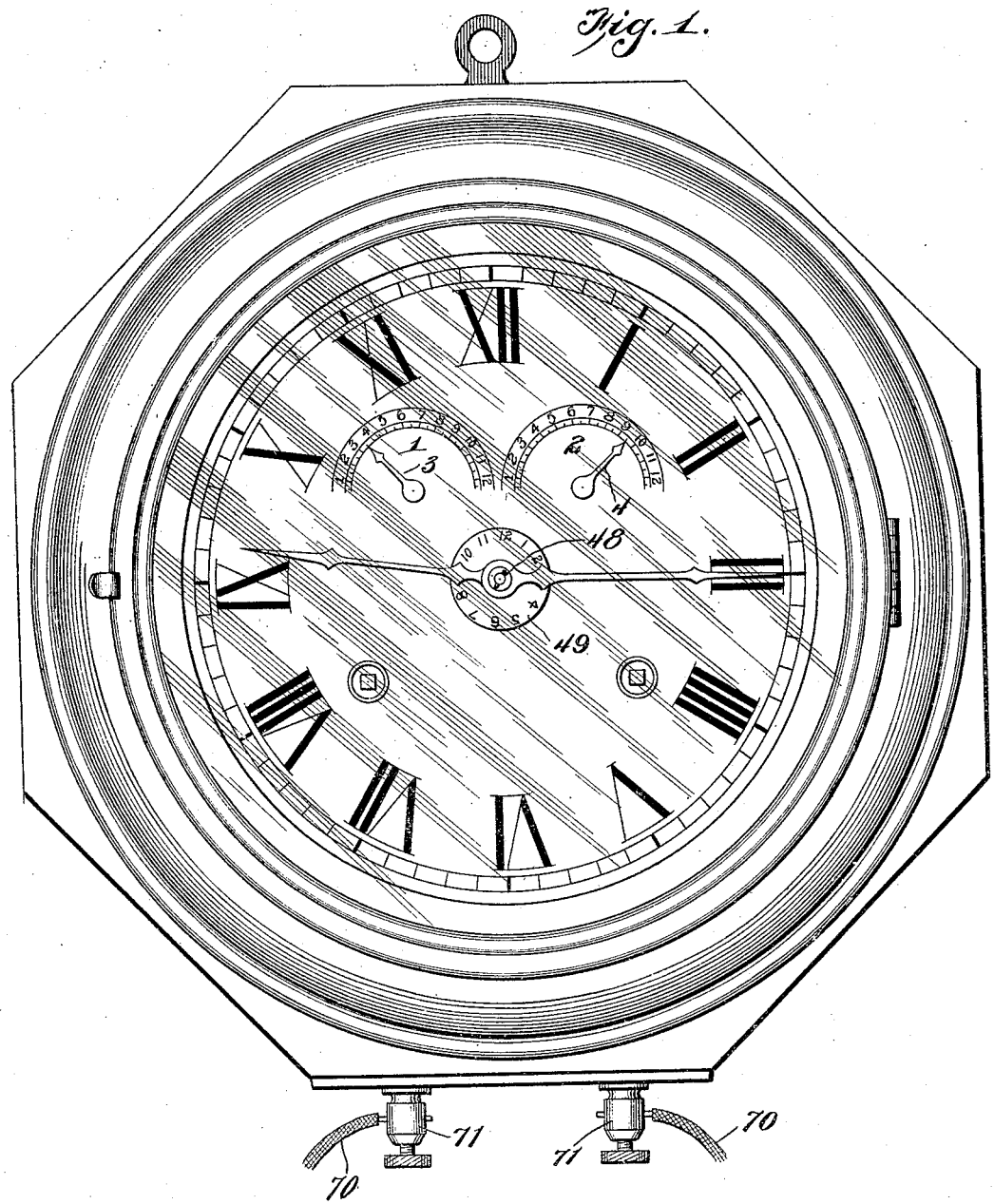

O. P. NOISOM & C. J. LINDEWALD.
SWITCH.
APPLICATION FILED SEPT. 19, 1908.

934,340.

Patented Sept. 14, 1909.
3 SHEETS—SHEET 1.

Witnesses
Louis R. Heinrichs
R. M. Smith

Inventors
Ole P. Noisom
Carl J. Lindewald
By Victor J. Evans
Attorney

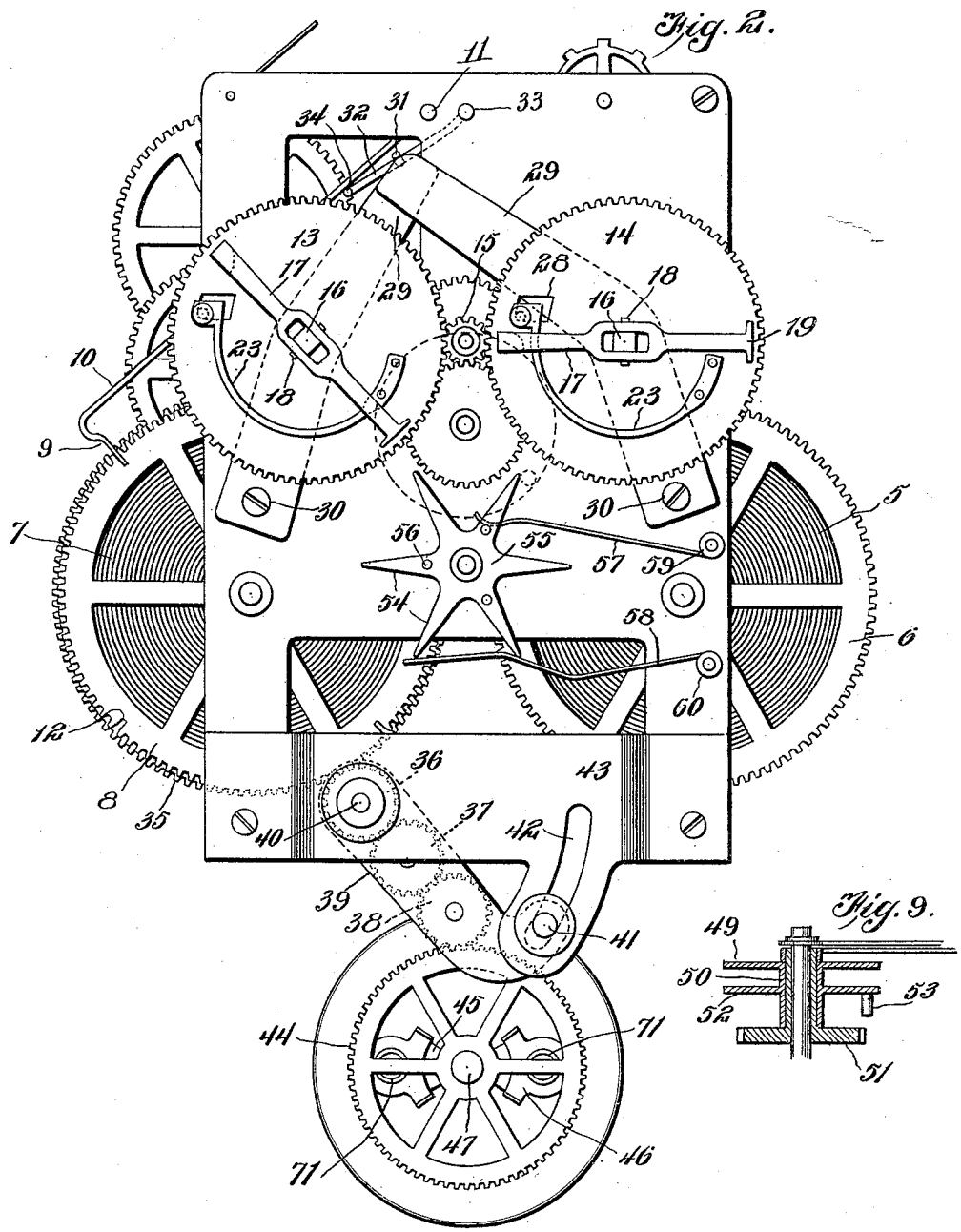

O. P. NOISOM & C. J. LINDEWALD.
SWITCH.
APPLICATION FILED SEPT. 19, 1908.
934,340.
Patented Sept. 14, 1909.
3 SHEETS—SHEET 3.
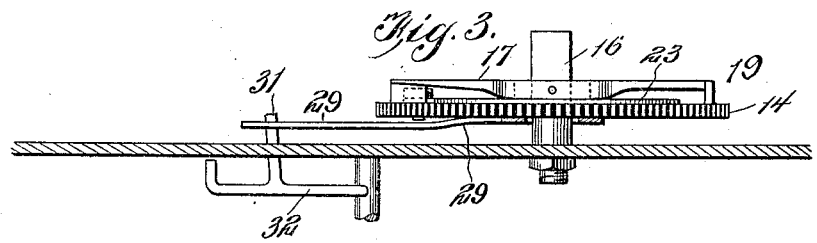
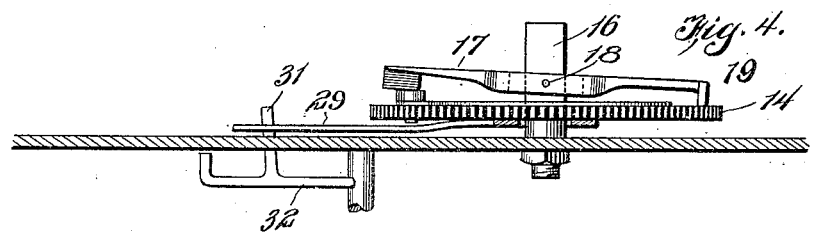
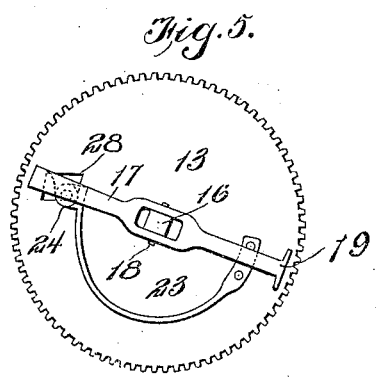
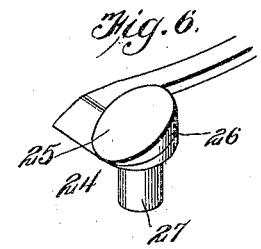
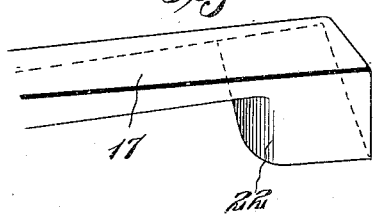
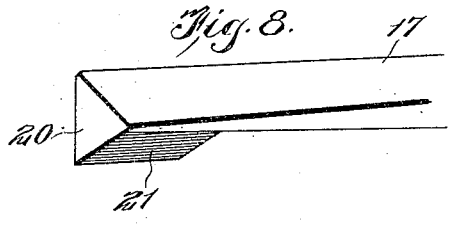
Witnesses
Louis R. Heinrichs,
P. M. Smith.
Inventor
Ole P. Noisom.
Carl J. Lindewald
By Victor J. Evans
Attorney

UNITED STATES PATENT OFFICE.

OLE P. NOISOM AND CARL J. LINDEWALD, OF SOUTH BEND, INDIANA; SAID LINDEWALD ASSIGNOR OF ONE-FOURTH OF THE ENTIRE RIGHT TO SAID NOISOM.

SWITCH.

934,340.     Specification of Letters Patent.     Patented Sept. 14, 1909.

Application filed September 19, 1908. Serial No. 453,739.

*To all whom it may concern:*

Be it known that we, OLE P. NOISOM and CARL J. LINDEWALD, citizens of the United States, residing at South Bend, in the county of St. Joseph and State of Indiana, have invented new and useful Improvements in Switches, of which the following is a specification.

This invention relates to electric time switches, the object of the invention being to simplify and improve the construction set forth in my prior application, Serial Number 412,923, filed January 27, 1908 and allowed July 1, 1908.

The object of the present invention is to provide simple and reliable mechanism whereby an electric circuit including lights or other elements may be automatically turned on and off at predetermined times and within a period as short as fifteen minutes.

A further object of the invention is to provide means whereby the usual night lights may be cut in and out independently of the main circuit controlling mechanism.

One of the main objects of the present invention is to provide setting means for accomplishing the result above set forth which will enable the indicators and tripping devices to be set back without tripping the mechanism which operates the movable switch element. This admits of the use of semi-circular dials in lieu of the complete circular dials heretofore used for this purpose.

With the above and other objects in view, the nature of which will more fully appear as the description proceeds, the invention consists in the novel construction, combination and arrangement of parts as hereinafter fully described, illustrated and claimed.

In the accompanying drawings:—Figure 1 is a face view of the clock having the invention applied thereto. Fig. 2 is a face view of the clock mechanism with the front of the clock case and dial removed. Fig. 3 is a cross section through the front plate of the clock mechanism showing the relation between the trip wheel and the presser bar and also showing the manner in which the trip wheel operates upon the devices which control the locking pawl of the collar spring. Fig. 4 is a view similar to Fig. 3, showing the coöperation between the presser bar and the yieldingly sustained knob carried by the trip wheel. Fig. 5 is a plan view of the trip wheel showing the knob and presser bar. Fig. 6 is an enlarged detail perspective view of one end of the presser bar, showing the rounded shoulder thereof. Fig. 7 is an enlarged detail perspective view of the yieldingly supported knob. Fig. 8 is a view of the same looking from the opposite side and showing the inclined face which coöperates with the knob on the trip wheel. Fig. 9 is a detail section taken in line with the minute wheel arbor, showing the setting dial for the star wheel switch.

The improved mechanism of this invention is shown applied to an ordinary eight-day clock illustrated in Fig. 1, which for the purpose of carrying out the present invention is provided with duplicate semi-circular dials 1 and 2 in connection with which indicating and setting hands 3 and 4 are employed, the dials being each graduated from one to twelve, the hand or indicator 3, for example, being used to cut in the current at a predetermined time while the other indicator or hand 4 is used for breaking the circuit or cutting out the lights at a predetermined time.

Referring to Fig. 2, 5 designates the main spring of the clock mechanism and 6 the master wheel thereof. At the opposite side is arranged the main power spring 7 which actuates the switch hereinafter referred to, the spring 7 serving to impart rotary motion to and lock the wheel 8 which is held normally locked by means of a locking pawl 9 on the free end of a pivotally mounted arm 10 which swings from the center 11, it being observed that the locking wheel 8 is provided at intervals with relatively deep notches 12 into which the locking pawl 9 drops and thereby serves to lock said wheel against further movement at the proper time.

In connection with the indicators or hands 3 and 4, we employ trip wheels 13 and 14 as shown in Fig. 2, said wheels being arranged at opposite sides of the minute pinion 15 and being in constant motion therewith so that continuous motion is imparted to the trip wheels 13 and 14, the same receiving their motion from the main spring 5 through the ordinary clock mechanism of which the minute pinion 15 is an element. Each of the wheels 13 and 14 is mounted upon the shaft or arbor 16 on which one of the indicators or hands 3 is made fast so that in turning or swinging the hand 3 or 4, the corresponding arbor is turned, the wheel 13 and 14 as the case may be being loose on such arbor 16, said wheel is not turned when movement is imparted to the arbor. The forward portion of each arbor 16 is squared as shown in Fig. 2 and pivotally mounted on such squared portion of the arbor is a presser bar 17 the same being fulcrumed at 18 on the arbor as clearly shown in Figs. 2, 3 and 4. One arm of the lever 17 is provided with an inwardly extending foot 19 which bears against the face of the wheel adjacent to the toothed outer edge thereof as best shown in Figs. 3 and 4. The other arm of said lever is provided with a projection or extension 20 at its end which also rides in contact with the same face of the trip wheel. At one side the projection or extension 20 is inclined to form a beveled shoulder 21 the purpose of which will hereinafter appear. At the opposite side the near corner of the projection or extension 20 is rounded off to form a rounded shoulder 22 the purpose of which will also hereinafter appear. Secured to the outer face of each of the trip wheels 13 and 14 is a spring 23 having at its free end a knob 24 provided with an inclined or beveled face 25 which is adapted to coöperate with the beveled face 21 of the presser bar 17, the knob being also provided with a rounded face 26 adapted to coöperate with the rounded shoulder 22 of the presser bar 17. The knob is also provided with an inwardly extending guide pin 27 which is received in an aperture or slot 28 formed in the adjacent trip wheel, said guide pin 27 serving to hold the knob in proper position to coöperate with the beveled or rounded shoulders on the presser bar.

Each of the trip wheels 13 and 14 is mounted loosely on its arbor and is adapted for movement in the direction of length of such arbor, the wheel being normally held outward in the position shown in Fig. 3 by means of a spring 29 one end of which is secured to the frame of the clock case as shown at 30, the other end being left free and at a short distance from the adjacent frame plate so that when the trip wheel is pressed toward the frame plate, the free end of such spring is pressed in a corresponding direction.

By reference to Fig. 2 it will be noted that the free ends of the spring arms 29 overlap each other at their extremities, at which point they both bear against a projecting finger 31 on a trip lever 32 which is fulcrumed at 33 on the clock frame. This trip lever 32 is provided at its free extremity with a lateral extension or pin 34 which lies under and bears against the arm 10 of the locking pawl 9, the arrangement being such that when either of the trip wheels 13 and 14 is pressed inward by the presser bar as hereinabove described, the appropriate spring arm 29 coöperates with the inclined pin or extension 31 to swing the trip lever 32 and cause it by means of the extension 34 to rock the arm 10 and move the locking pawl 9 out of engagement with the locking wheel 8. This releases the spring 7 and allows the same to expand and impart rotary motion to the wheel 8. At the same time the spring 7 imparts motion to a second gear 35 which meshes with the first member of a train of gears or pinions 36, 37 and 38 of which all are journaled upon a pivoted gear arm 39, as shown in Fig. 2. This gear arm is mounted for swinging movement on the arbor or shaft 40 of the first gear 36 while the opposite or free end of said arm is provided with a clamping screw 41 the shank of which is movable in an arcuate slot 42 formed in a cross bar 43 of the clock frame. This allows the final gear or pinion 38 to be moved into and out of mesh with a gear 44 which carries the movable element 45 of an electric switch, the fixed contact pieces of which are shown at 46. The electric switch referred to is shown as of the ordinary rotating type embodying a central shaft 47 carrying the radially disposed movable element or elements 45 which are moved alternately into and out of contact with the stationary contact pieces 46, it being understood that in each movement of the tripping mechanism above described, approximately a quarter revolution is imparted to the arbor 47 of the switch, one movement serving thereby to complete the circuit and the succeeding movement serving to break the circuit. By arranging the train of gears in the pivoted gear arm 39 as above described, different sized electric switches may be interchangeably used in connection with the rest of the mechanism according to the power of the current required.

In the ordinary tripping movement of the mechanism hereinabove described, in the rotation of either of the wheels 13 and 14, the spring supported knob 24 thereof rides under the projection 20 of the presser bar and coöperating with the inclined face 21 thereof, the knob is pressed inward by the presser bar which serves to correspondingly press the respective trip gear inward with the effect above described, the foot 19 at the opposite end of the presser bar serving to equalize the pressure at both sides of the trip wheel and insure the even and uniform movement of the trip wheel on the frame of the clock mechanism. In setting the presser bar with the aid of the indicators or hands 3 and 4, the rounded shoulder 22 of the presser bar rides against the rounded shoulder 26 of the knob and forces said knob inward as illustrated in Fig. 5 without tripping said wheel or in other words, without depressing the adjacent trip wheel 13 or 14 toward the frame of the clock case. This permits the tripping mechanism to be set without unlocking or releasing the power spring 7 which would result in the movement of the switch.

Mounted on the minute arbor 48 of the clock mechanism is a circular dial 49 graduated from one to twelve as seen in Fig. 1. This dial 49 comprises an inwardly extending sleeve 50 which is mounted loosely but frictionally on the tubular hub of the hour wheel 51 as shown in Fig. 9. Mounted fast on the same sleeve 50 is a disk 52 which is provided with an inwardly extending pin or tappet 53 adapted to come in contact with any one of the spokes 54 of a star wheel 55 shown in Fig. 2. This star wheel is shown as provided with six arms or spokes and with three projecting pins or contact points 57 one of which is adapted to come in contact with the free end of the spring arm 57 while another spring arm 58 is arranged for contact with one or more of the extremities of the arms or spokes 54. These springs 57 and 58 are of metal and serve as electrical conductors, said springs connecting at their fixed ends with the binding posts 59 and 60 to which the circuit wires may be connected. The dial 49 may be set to bring the pin 53 at a point which will cause it to come in contact with one of the spokes or arms of the star wheel 55 at any predetermined time. When this takes place, a partial revolution is imparted to the star wheel causing one of the contact points 56 to either move into or out of contact with the spring conductor 59 resulting in establishing or breaking the current in which the arms or springs 58 and 57 are included.

70 designates the main circuit wires which lead to the binding posts 71 electrically associated with the fixed contacts 46 hereinabove described.

The mechanism above described is simple and economical in construction and will be found reliable in use, there being no delicate parts which will be liable to become broken or disarranged.

I claim:—

1. An electric time switch comprising clock mechanism including a power spring, a movable switch element geared to and operable by said spring, means for locking the power spring to hold the same inert, a trip wheel geared to and driven by an element of the clock mechanism, an adjustable presser bar movable around the arbor of the trip wheel and adapted to be set at various positions to act on said wheel, a knob on the trip wheel which coöperates with said presser bar acting to shift said wheel in the direction of length of its arbor, and means actuated by the shifting of the trip wheel acting to unlock the power spring and permit the latter to move the switch element.

2. An electric time switch comprising a clock mechanism including a power spring, a movable switch element geared to and operable by said spring, means for locking the power spring to hold the same inert, a trip wheel geared to and driven by an element of the clock mechanism, an adjustable presser bar movable around the arbor of the trip wheel and adapted to be set at various positions to act on said wheel, a yieldingly sustained knob on the trip wheel which coöperates with said presser bar acting to shift said wheel in the direction of length of its arbor, and means actuated by the shifting of the trip wheel acting to unlock the power spring and permit the latter to move the switch element.

3. An electric time switch comprising a clock mechanism including a power spring, a movable switch element geared to and operable by said spring, means for locking the power spring to hold the same inert, a trip wheel geared to and driven by an element of the clock mechanism, an adjustable presser bar movable around the arbor of the trip wheel and adapted to be set at various positions to act on said wheel, a knob on the trip wheel which coöperates with said presser bar acting to shift said wheel in the direction of length of its arbor, said knob being adapted to be moved out of the way by the presser bar in the act of setting the latter, and means actuated by the shifting of the trip wheel acting to unlock the power spring and permit the latter to move the switch element.

4. An electric time switch comprising a clock mechanism including a power spring, a movable switch element geared to and operable by said spring, means for locking the power spring to hold the same inert, a trip wheel geared to and driven by an element of the clock mechanism, an adjustable presser bar movable around the arbor of the trip wheel and adapted to be set at various positions to act on the said wheel, said presser bar having a beveled and rounded shoulder, and yieldingly sustained beveled faces on the trip wheel which coöperate with said presser bar acting to shift said wheel in the direction of length of its arbor, and means actuated by the shifting of said trip wheel acting to unlock the power spring and permit the latter to move the switch element.

5. An electric time switch comprising clock mechanism, a switch operating power spring, a movable switch element, means including a trip for locking and unlocking the power spring, a bearing interposed between the power spring and switch and embodying a train of gears, a movable support on which said gears are mounted, and means for fastening said support when adjusted.

6. An electric time switch comprising clock mechanism, a main circuit switch, an auxiliary switch embodying a revolving wheel provided with a series of radiating arms and a series of laterally projecting pins on certain of said arms, circuit terminals consisting of springs one working against the extremities of said arms and another against said pins, a dial frictionally mounted on the hour wheel, and an auxiliary switch-actuating pin carried by said dial and adapted to operate against the arms of the auxiliary switch.

In testimony whereof we affix our signatures in presence of two witnesses.

OLE P. NOISOM.
CARL J. LINDEWALD.

Witnesses:
CHAS. A. IVORY,
ARTHUR BRUBAKER.